(12) United States Patent
Lee

(10) Patent No.: US 11,707,723 B2
(45) Date of Patent: Jul. 25, 2023

(54) RADIAL FLOW REACTOR

(71) Applicant: Sang Kook Lee, Henderson, NV (US)

(72) Inventor: Sang Kook Lee, Henderson, NV (US)

(*) Notice: Subject to any disclaimer, the term of this patent is extended or adjusted under 35 U.S.C. 154(b) by 0 days.

(21) Appl. No.: 17/457,484

(22) Filed: Dec. 3, 2021

(65) Prior Publication Data

US 2022/0176338 A1 Jun. 9, 2022

Related U.S. Application Data

(60) Provisional application No. 63/231,311, filed on Aug. 10, 2021, provisional application No. 63/121,491, filed on Dec. 4, 2020.

(51) Int. Cl.
*B01J 19/24* (2006.01)
(52) U.S. Cl.
CPC .......... *B01J 19/245* (2013.01); *B01J 2219/24* (2013.01)
(58) Field of Classification Search
CPC ........ B01D 53/00; B01D 53/02; B01D 53/04; B01D 53/0407; B01D 53/0431; B01D 53/047; B01D 53/0476; B01D 2256/00; B01D 2256/12; B01J 8/00; B01J 8/001; B01J 8/008; B01J 8/02; B01J 8/04; B01J 8/0403; B01J 8/0407; B01J 8/0446; B01J 8/0461; B01J 8/0492; B01J 19/00; B01J 19/24; B01J 19/245; B01J 2219/00; B01J 2219/02; B01J 2219/24; C01B 13/00; C01B 13/02; C01B 13/0229; C01B 13/0248; C01B 13/0259
See application file for complete search history.

(56) References Cited

U.S. PATENT DOCUMENTS 6,790,415 B2 * 9/2004 Petit ..................... B01D 53/047
422/619
7,311,763 B2 * 12/2007 Neary ................ B01D 53/0431
96/121

(Continued)

FOREIGN PATENT DOCUMENTS

DE 102005049699 A1 4/2007
EP 1022056 A1 7/2000

(Continued)

OTHER PUBLICATIONS

Machine translation of the Abstract of JP 61020925 A, published on Sep. 17, 1086 and provided in IDS filed on Feb. 17, 2023. (Year: 1986).*

(Continued)

*Primary Examiner* — Natasha E Young
(74) *Attorney, Agent, or Firm* — Harness, Dickey & Pierce PLC

(57) ABSTRACT

The present disclosure relates to a radial flow reactor including a pair of beds configured to produce a product by processing a raw material supplied thereto. A substance being produced or the product is movable between the pair of beds before the product is moved to a separate reservoir. The ratio of the area of an outlet with respect to the area of an inlet in each of the pair of beds is adjusted such that, when the substance being produced or the product is introduced into the outlet of one bed of the pair of beds from the other bed of the pair of beds, limited processing efficiency caused by the limited area of the outlet in each of the pair of beds is overcome.

11 Claims, 10 Drawing Sheets

(56) References Cited

U.S. PATENT DOCUMENTS

2001/0022955 A1  9/2001  Petit et al.
2007/0088092 A1  4/2007  Klanner et al.

FOREIGN PATENT DOCUMENTS

| FR | 3059911 A3 | 6/2018 |
| JP | 1973-86785 A | 2/1972 |
| JP | 1986-209025 A | 9/1986 |
| JP | 2011-206648 A | 10/2011 |
| WO | WO-2012/173731 A2 | 12/2012 |

OTHER PUBLICATIONS

Extended European Search Report of EP patent application No. 21211433.4, dated Apr. 12, 2022.
Japanese Office Action regarding Application No. 2021-196807 dated Nov. 22, 2022.

\* cited by examiner

【Fig. 1】
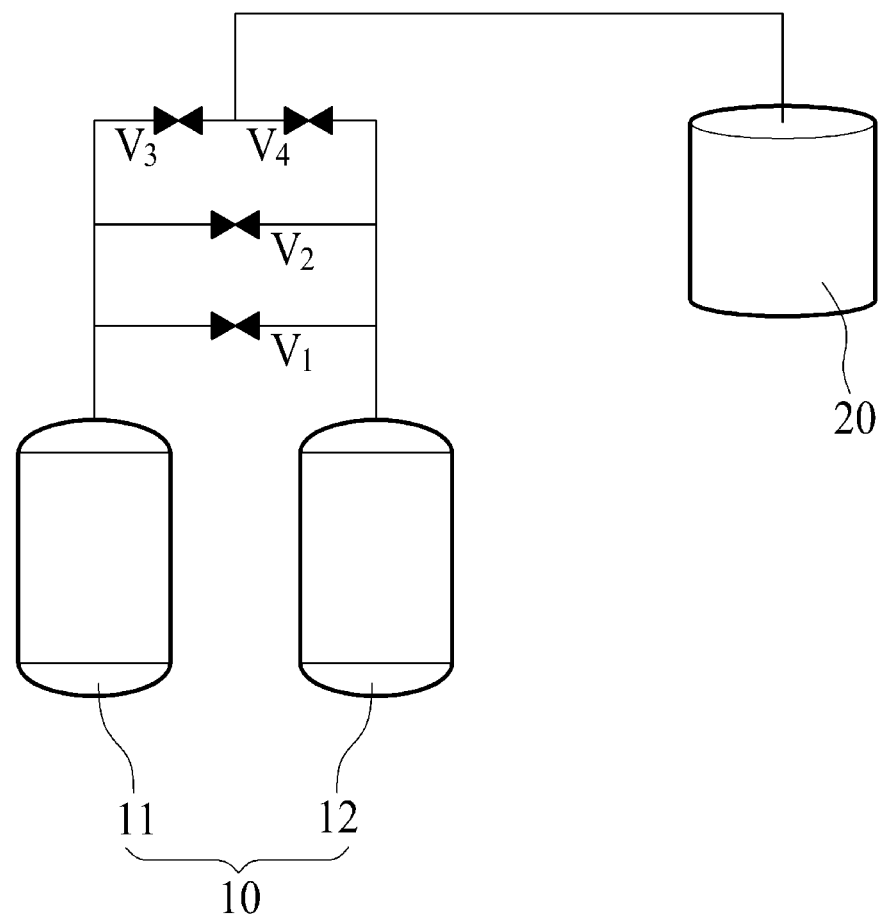

[Fig. 2]
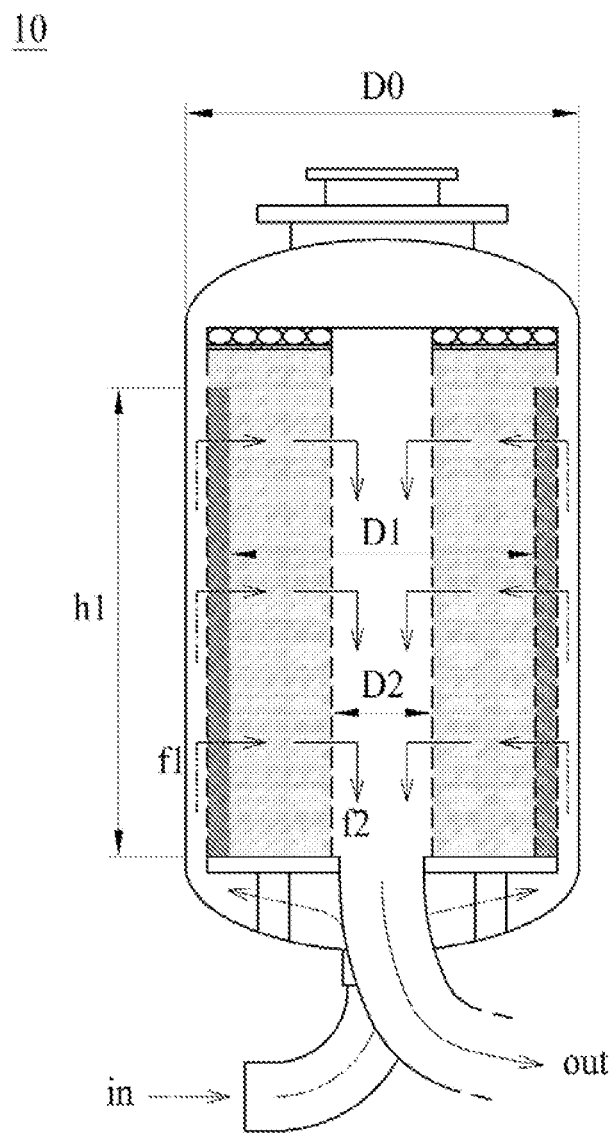

[Fig. 3]

| Description | Label | Unit | Value |
|---|---|---|---|
| Bed outer diameter | D0 | ft | 11.71 |
| Bed internal volume diameter | D2 | ft | 4.50 |
| Bed's 1st active material outer diameter | D1 | ft | 10.08 |
| Bed's 1st active material thickness | | ft | 2.79 |
| Bed's active material height | h1 | ft | 12.80 |
| Bed's nominal inlet area of active material 1 (= pi*D1*h1) | A_inN | ft$^2$ | 405 |
| Bed's nominal outlet area of active material 1 (= pi*D2*h2) | A_outN | ft$^2$ | 181 |
| Bed's effective inlet area of active material 1 (= A_inN/1.2) | A_inE | ft$^2$ | 337.4 |
| Bed's effective outlet area of active material 1 (= A_outN*1.2) | A_outE | ft$^2$ | 217.0 |
| Active material volume | V_am1 | ft$^3$ | 817 |
| Equivalent axial bed inlet & outlet area (Axial bed height = 3.5 ft) | A_ax | ft$^2$ | 233.4 |
| Inlet area ratio (= A_inE/A_ax) | r_in | | 145% |
| Outlet area ratio (= A_outE/A_ax) | r_out | | 93% |

【Fig. 4】
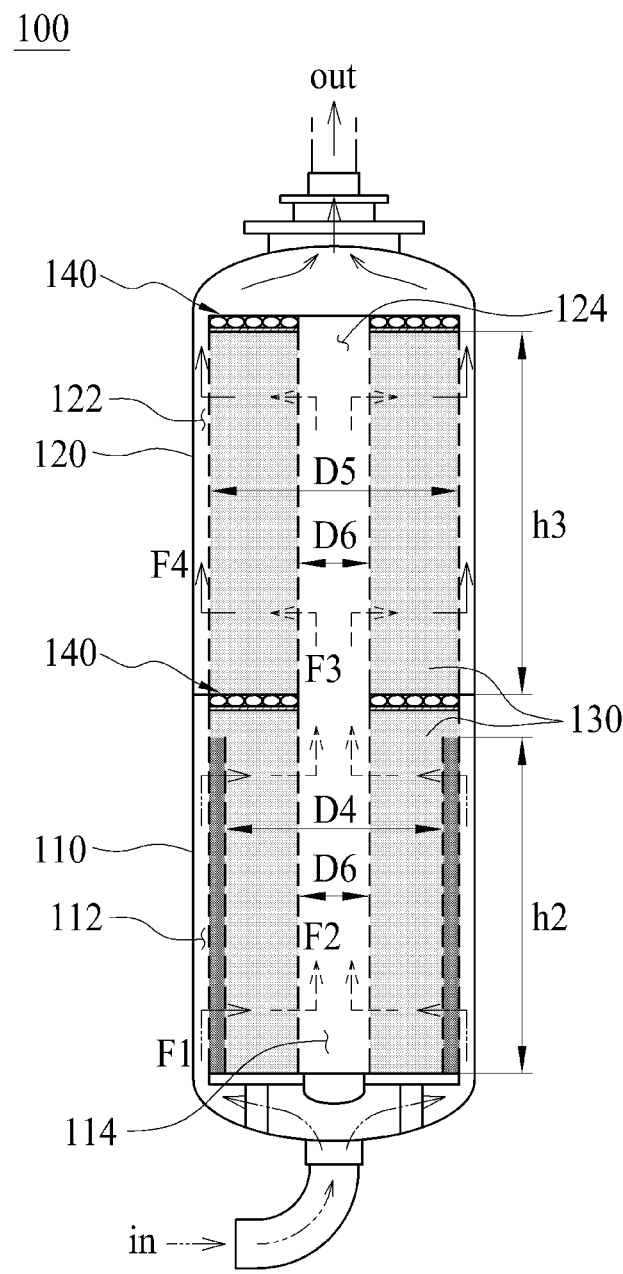

【Fig. 5】
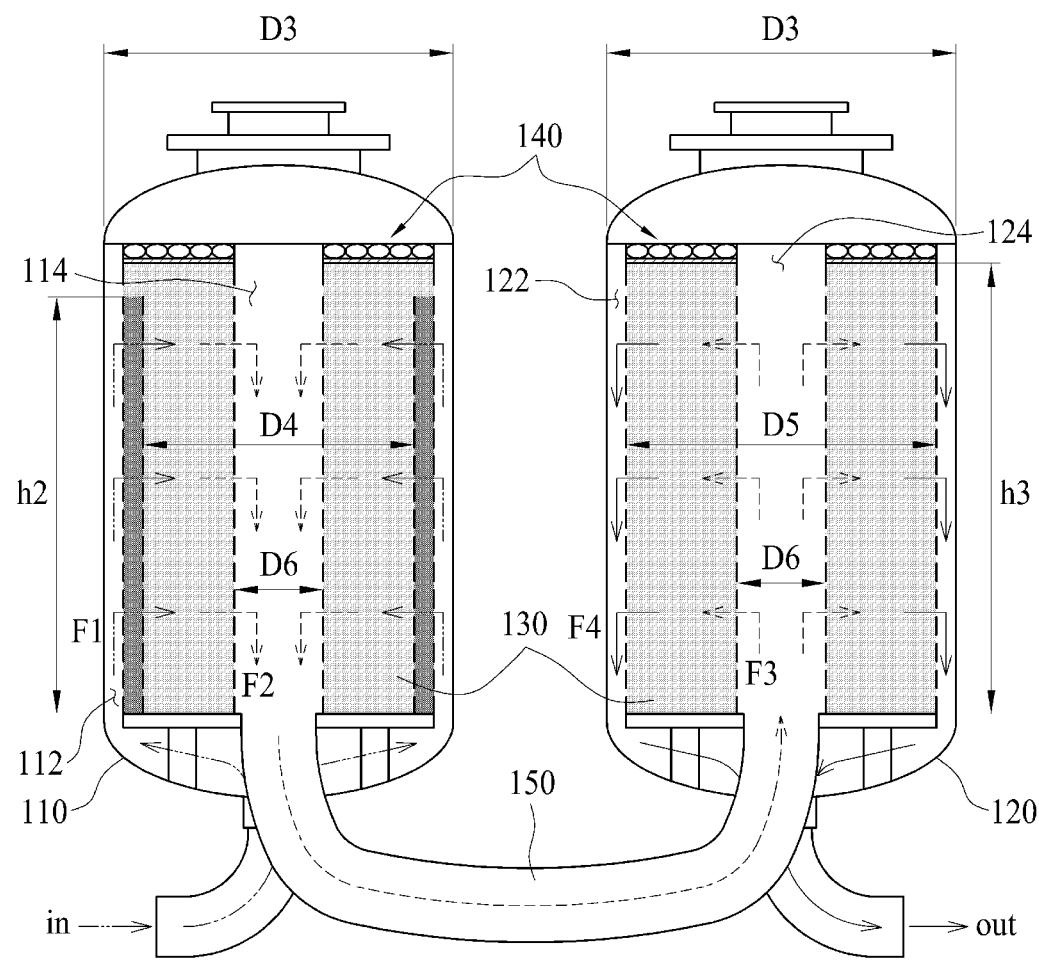

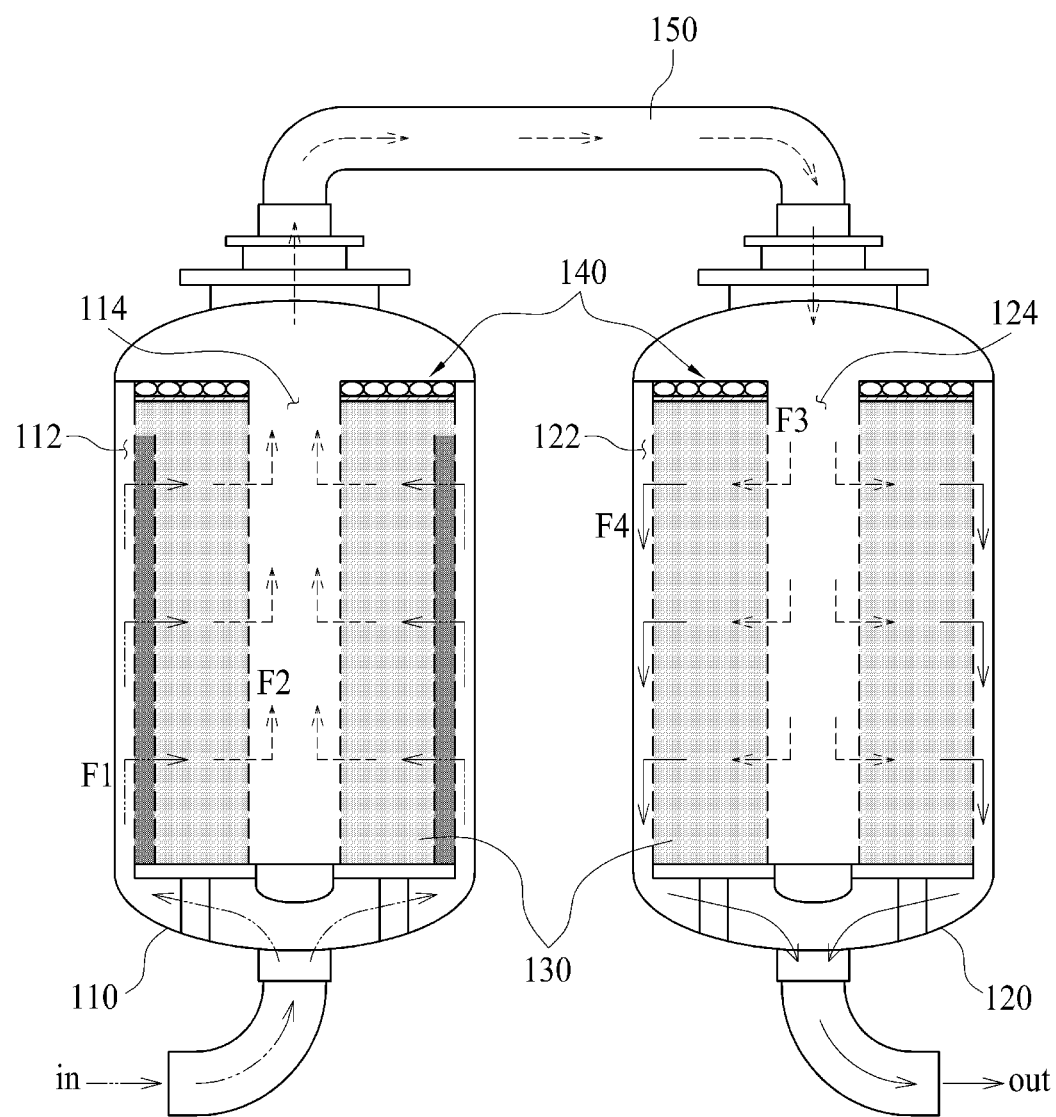
[Fig. 6]

[Fig. 7]
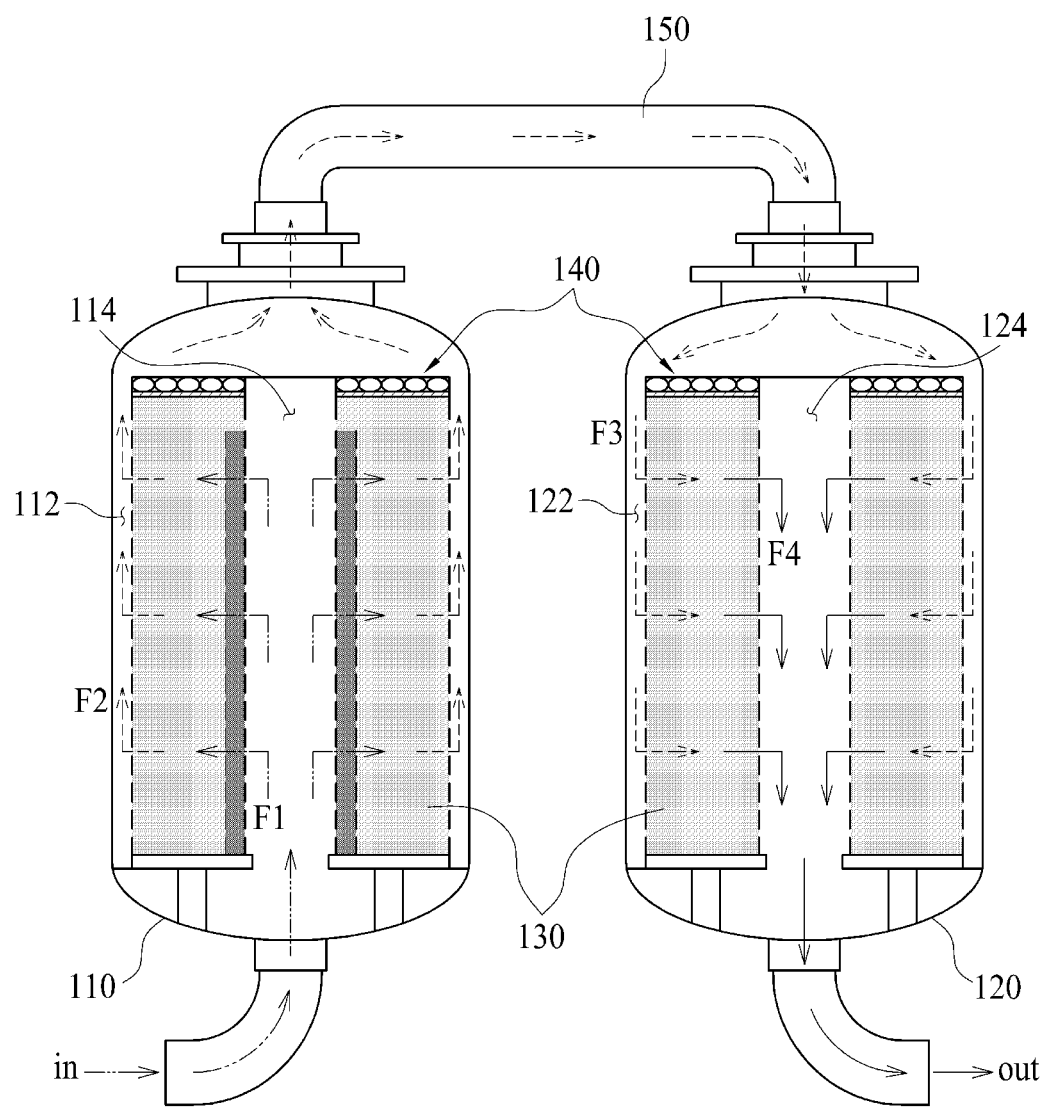

[Fig. 8]

| Description | Label | Unit | Value |
|---|---|---|---|
| Bed_1, Bed_2 outer diameter | D3 | ft | 7.22 |
| Bed_1 and Bed_2 internal volume diameter | D6 | ft | 2.95 |
| Bed_1, 1st active material outer diameter | D4 | ft | 5.65 |
| Bed_1, 1st active material thickness |  | ft | 1.35 |
| Bed_2, 1st active material outer diameter | D5 | ft | 6.48 |
| Bed_2, 1st active material thickness |  | ft | 1.77 |
| Bed_1, active material height | h2 | ft | 19.52 |
| Bed_2, active material height | h3 | ft | 17.06 |
| Bed_1, nominal inlet area of active material 1 (= pi*D1*h2) | A_InN | $ft^2$ | 346.3 |
| Bed_2, nominal outlet area of active material 1 (= pi*D2*h3) | A_outN | $ft^2$ | 347.3 |
| Bed_1, effective inlet area of active material 1 (= A_inN/1.2) | A_inE | $ft^2$ | 288.6 |
| Bed_2, effective outlet area of active material 1 (= A_outN/1.2) | A_outE | $ft^2$ | 289.4 |
| Active material 1 total volume in Bed_1 and Bed_2. | V_am1 | $ft^3$ | 801.6 |
| Equivalent axial bed inlet & outlet area (Axial bed height = 3.5 ft) | A_ax | $ft^2$ | 229.0 |
| Inlet area ratio (= A_inE/A_ax) | r_in |  | 126% |
| Outlet area ratio (= A_outE/A_ax) | r_out |  | 126% |

[Fig. 9]
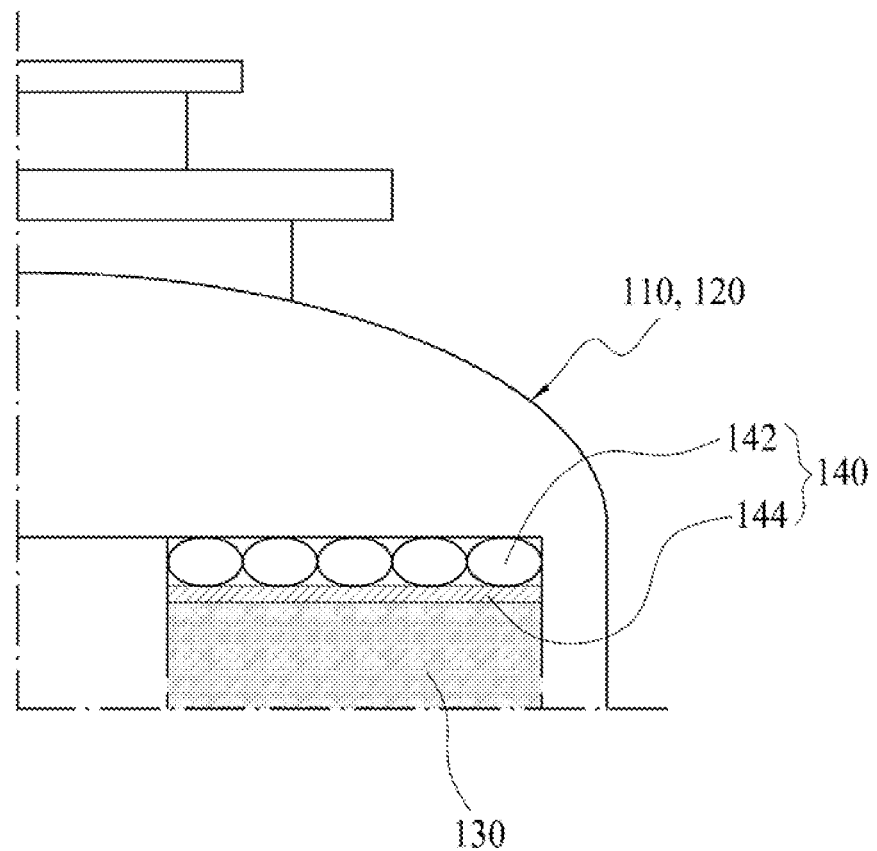

[Fig. 10]
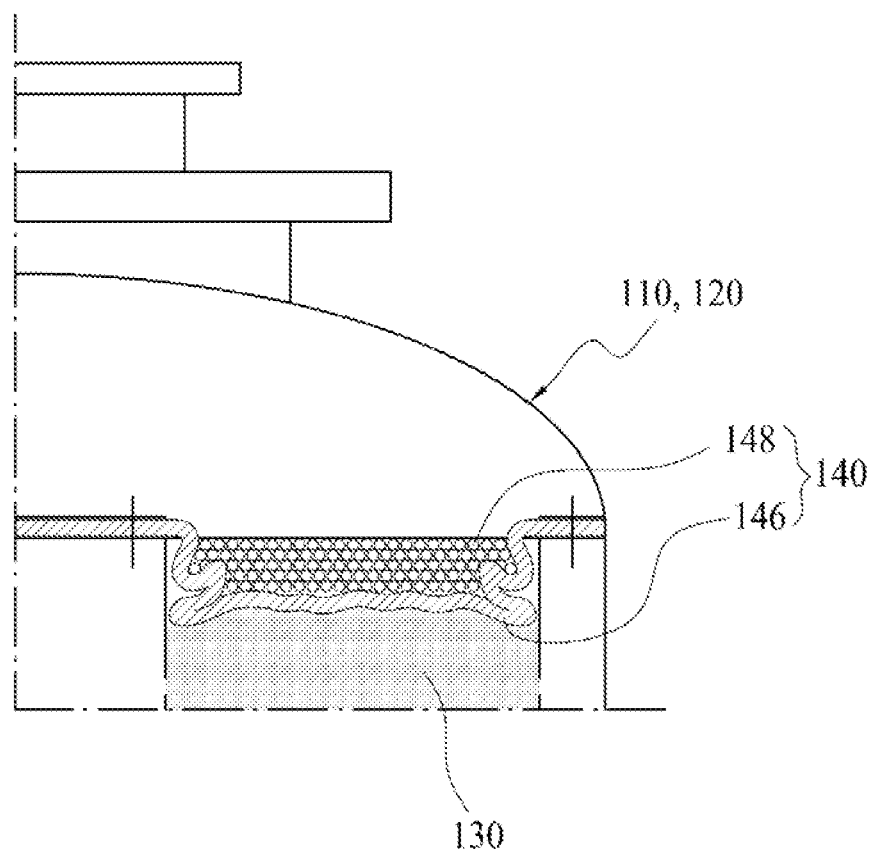

RADIAL FLOW REACTOR

CROSS-REFERENCE TO RELATED APPLICATION

This application claims under 35 U.S.C. § 119(a) the benefit of priority to U.S. provisional Applications No. 63/121,491 filed on Dec. 4, 2020 and No. 63/231,311 filed on Aug. 10, 2021, the entire contents of which are incorporated herein by reference.

BACKGROUND

(a) Technical Field

The present disclosure relates to a radial flow reactor, and more specifically, to a radial flow reactor including a pair of beds and having a configuration in which the ratio of the area of an outlet with respect to the area of an inlet in each of the beds may be adjusted to overcome limited processing efficiency caused by the limited area of the outlet of each of the beds when a substance being produced or a product is moved between the beds.

(b) Background Art

In industrial sites, a variety of flow reactors, which produce a product by processing a raw material supplied thereto, are present. Here, the term "flow reactor" collectively refers to reactors in each of which the raw material undergoes a reaction while being moved along a flow path disposed inside the reactor, thereby producing a product.

Such flow reactors are divided into axial flow bed (AFB) reactors in which a flow of producing a raw material into a product is formed along an axis and radial flow bed (RFB) reactors in which a flow of producing a raw material into a product is formed to unfold or gather in an annular shape about an axis.

Here, in order to increase the capacity of processing without a change in the thickness of active materials formed within a reactor, it is required for an axial flow reactor (AFB) to increase the diameter thereof. When the diameter is increased, the possibility of a non-uniform flow of a raw material may be increased, and its transportation is significantly inconvenient.

Thus, it may be regarded that a radial flow reactor (RFB) is more advantageous to increase the capacity of processing without a change in the thickness of active materials formed inside the reactor, since it is merely required to increase the height of the radial flow reactor. However, in a case in which a system is composed of two or more radial flow reactors, a flow between beds may have an excessive speed due to the limited area of an outlet of the bed. Thus, there are drawbacks in that the capacity of processing may be reduced and the level of purity of a product may be lowered, thereby leading to limited efficiency of processing.

In this regard, an example will be described as follows with reference to FIGS. 1 to 3.

Here, FIG. 1 is a schematic view illustrating a general process of producing a product using a conventional radial flow reactor, FIG. 2 is a longitudinal cross-sectional view of the conventional radial flow reactor, and FIG. 3 illustrates a modeling result from which the difference of the area between an inlet and an outlet of the conventional radial flow reactor may be reviewed.

First, the general process will be described with reference to FIG. 1. To increase the efficiency of producing a product from a raw material, as illustrated in FIG. 1, a pair of beds 11 and 12, each of which is provided as a conventional radial flow reactor 10 shown in FIG. 2, are repeatedly operated in an alternating manner.

That is, when a raw material is supplied to the bed 11, a product is produced by processing (or reacting) the supplied raw material. Then, a valve V3 is opened to move a product that has been received from the bed 12 in the previous step to a reservoir 20. Here, a portion of the product is sent to the bed 12 in which a reaction has been performed previously, by opening a valve V1 so as to promote a regeneration operation of the bed 12 by cleaning the bed 12. When the bed 12 is sufficiently regenerated, the remaining product is moved to the bed 12 by opening a valve V2.

Subsequently, when a raw material is supplied to the bed 12, a product is produced by processing the supplied raw material. Then, a valve V4 is opened to move the product received from the bed 11 to a reservoir 20 in a manner corresponding to the above description. A portion of the product is sent to the bed 11 in which the reaction has been performed by reopening the valve V1 so as to promote a regeneration operation of the bed 11 by cleaning the bed 11. When the bed 11 is sufficiently regenerated, the remaining product is moved to the bed 11 by reopening the valve V2.

Thus, moving the products between the bed 11 and the bed 12 by opening the valve V2 is intended to perform an additional reaction with the active material, which has been cleaned and regenerated in each of the beds 11 and 12, thereby producing a final product having a higher level of purity.

Here, a predetermined contact time should be ensured so that the product, which have been previously produced in the other bed and moved from the other bed, sufficiently performs an additional reaction with the active material, which has been cleaned and regenerated. Thus, the flow rate of the product moving from one bed to the other bed (hereinafter, referred to as the product moving from the bed 11 to the bed 12) is preferable to be slow enough to ensure the above-described contact time.

However, when the flow rate of the product moving from the bed 11 to the bed 12 is too slow, a standby time required for supplying the raw material again to the bed 11 is increased. Thus, in the entirety of the radial flow reactor, the amount of the raw material that can be processed per hour, i.e., processing efficiency, may be reduced, which is problematic.

Thus, for the moved product to sufficiently perform an additional reaction with the cleaned and regenerated active material, a sufficient time for contact between the two products needs to be ensured. On the other hand, the amount of flow of the product moving from the bed 11 to the bed 12 needs to be increased in order to improve overall processing efficiency.

For example, when the product moves from the bed 11 to the bed 12, in order to increase the amount of flow at the receiving portion of the bed 12, through which the product is introduced, the area of the receiving portion of the bed 12 preferably needs to be adjusted to be greater. However, the corresponding portion is also a portion through which the product is discharged from the bed 12. Thus, in view of the structure of the bed 12 of the radial flow reactor 10, it is actually impossible to adjust the corresponding area to be greater.

That is, as illustrated in FIG. 2, in the bed 12 of the conventional radial flow reactor 10, a flow f1 on which the raw material is introduced should occur in a wide area having a diameter D1, whereas a flow f2 on which the product is discharged should occur in a narrow area having a diameter D2. Thus, as described above, the area, through which the product moving at the bed 11 is introduced, should be the narrow area having the diameter D2.

In order to increase the narrow area, the diameter D1 associated with the diameter D2 should also be increased. Since the diameter D1 determines the overall size of the radial flow reactor 10, considering the advantage of the radial flow reactor in comparison to the axial flow reactor in which an increase in the diameter D1 is not required, the diameter D1 cannot be substantially increased. As a result, the area gradient of the internal flow of the entirety of the radial flow reactor 10 should have a trapezoidal shape with the top edge being significantly smaller than the bottom edge when a bottom edge refers to a side on which the inlet is positioned and a top edge refers to a side on which the outlet is positioned.

Accordingly, in the case of the conventional radial flow reactor 10 illustrated in FIG. 2, the area of the outlet with respect to the inlet cannot be adjusted, as can be seen in detail from the modeling result illustrated in FIG. 3. Thus, when a substance being produced or a product is moved between the beds, processing efficiency may be limited due to the limited area of the outlet of the bed.

SUMMARY OF THE DISCLOSURE

The present disclosure has been made in an effort to solve the above-described problem associated with the related art, and an objective of the present disclosure is to provide a radial flow reactor including a pair of beds and having a configuration in which the ratio of the area of an outlet to the area of an inlet in each of the beds may be adjusted to overcome limited processing efficiency caused by the limited area of the outlet of each of the beds when a substance being produced or a product is moved between the beds.

According to the present disclosure, a radial flow reactor may include: a first bed and a second bed each including a cylindrical body, an annular reaction region provided along a central axis within the body, a first flow path provided between an inner surface of the body and the reaction region, and a second flow path provided between the central axis of the body and the reaction region, wherein, when a raw material is introduced into the first bed, the raw material sequentially passes through the reaction region of the first bed and the reaction region of the second bed, thereby forming a product, and a ratio of an area of an outlet with respect to an area of an inlet in the entire reactor including the first bed and the second bed is adjusted by configuring the first flow path or the second flow path of the first bed, into which the raw material is introduced, and the first flow path or the second flow path of the second bed, through which the product produced through the reaction region is discharged, to correspond to each other equally.

Here, the ratio of the area of the outlet with respect to the area of the inlet in the entire reactor including the first bed and the second bed may range from 0.7 to 1.7. Also, the raw material may be air, and the product may be oxygen, and the entire reactor including the first bed and the second bed may be used as a portion of a pressure swing adsorption oxygen generator or a vacuum pressure swing adsorption oxygen generator.

In addition, the area gradient of an internal flow in the entire reactor including the first bed and the second bed may have a shape of  when the inlet is on a top edge and the outlet is on a bottom edge.

In order to have the area gradient having such a shape, the radial flow reactor according to the present disclosure may be configured such that the product produced as a substance introduced into the first flow path of the first bed has passed through both the reaction regions of the first bed and the second bed is discharged through the first flow path of the second bed.

Alternatively, the radial flow reactor according to the present disclosure may be configured such that the product produced as a substance introduced into the second flow path of the first bed has passed through both the reaction regions of the first bed and the second bed is discharged through the second flow path of the second bed.

According to the present disclosure, a radial flow reactor may include a pair of beds configured to produce a product by processing a raw material supplied thereto. A substance being produced or the product may move between the pair of beds before the product is moved to a separate reservoir. The ratio of an area of an outlet with respect to an area of an inlet in each of the pair of beds may be adjusted in order to overcome limited processing efficiency caused by the limited area of the outlet in each of the pair of beds, when the substance being produced or the product is introduced into the outlet of one bed of the pair of beds from the other bed of the pair of beds.

Here, when the raw material is supplied first to one bed of the pair of beds, the product may be discharged through the other bed of the pair of beds, and continuously, when the raw material is supplied to the other bed, from which the product has been discharged, the product may be discharged through the one bed to which the raw material has been supplied.

Here, when the inlet of the bed of the pair of beds, to which the raw material is supplied, is on a bottom edge and the outlet of the bed is on a top edge, the inner area gradient of the bed of the pair of beds, to which the raw material is supplied, may have a shape of  after the raw material is introduced and before the substance being produced or the product moves to the bed of the pair of beds, from which the product is discharged.

In the radial flow reactor having the area gradient having such a shape according to the present disclosure, the bed of the pair of beds, to which the raw material is supplied, may include a first bed into which the raw material is introduced and a second bed in which a continuous reaction subsequent to a reaction in the first bed occurs. The first bed and the second bed may be connected in series, thereby forming an inner area gradient having a shape of  when the inlet of the bed of the pair of beds, to which the raw material is supplied, is on the bottom edge and the outlet of the bed is on the top edge.

In addition, each of the first bed and the second bed may include a reaction region provided between a first flow path provided along an inner surface of its body in a height direction and a second flow path provided along a central axis in the height direction, such that the substance being produced or the product is produced as the raw material passes through the reaction region while moving from the first flow path to the second flow path or from the second flow path to the first flow path.

When the substance being produced or the product is discharged through the second flow path of the first bed as the raw material supplied to the first flow path of the first bed has passed through the reaction region of the first bed, the substance being produced or the product may be introduced into the second flow path of the second bed.

Also, when the substance being produced or the product is discharged through the first flow path of the first bed as the raw material supplied to the second flow path of the first bed has passed through the reaction region of the first bed, the substance being produced or the product may be introduced into the first flow path of the second bed.

In each of the pair of beds, the ratio of the area of the outlet with respect to the area of the inlet in the entire bed including the first bed and the second bed may range from 0.7 to 1.7.

In addition, the first bed and the second bed may have different shapes and sizes and are made of different materials. Also, the raw material may be air, and the product may be oxygen, and the pair of beds may be used as a portion of a pressure swing adsorption oxygen generator or a vacuum pressure swing adsorption oxygen generator.

In addition, each of the first bed and the second bed may further include a volume adjusting unit on top of the respective reaction region, the volume adjusting unit being configured to cope with a change in volume of the reaction region caused by production of the substance being produced or the product.

Here, the volume adjusting unit may include a bag in which a fluid capable of swelling in response to the change in the volume of the reaction region is contained.

In addition, the volume adjusting unit may include a flexible gasket configured to be moved upward or downward in response to the change in the volume of the reaction region and weights configured to move the gasket downward and maintain the gasket in equilibrium.

In the radial flow reactor according to the present disclosure, it is possible to adjust the ratio of the area of the outlet with respect to the area of the inlet in the entirety of the reactor including the first bed and the second bed by setting flow directions, heights, widths, or the like in advance for the first bed and the second bed of the pair of beds, thereby overcoming limited processing efficiency caused by the limited area of the outlet of each of the beds when a substance being produced or a product is moved between the pair of beds.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein:

FIG. 1 is a schematic view illustrating a general process of producing a product using a conventional radial flow reactor;

FIG. 2 is a longitudinal cross-sectional view of the conventional radial flow reactor;

FIG. 3 illustrates a modeling result from which the difference of the area between the inlet and the outlet of the conventional radial flow reactor may be reviewed;

FIG. 4 is a longitudinal cross-sectional view illustrating a bed included in the first embodiment of the radial flow reactor according to the present disclosure;

FIG. 5 is a longitudinal cross-sectional view illustrating beds included in the second embodiment of the radial flow reactor according to the present disclosure;

FIG. 6 is a longitudinal cross-sectional view illustrating a modified example of the beds included in the second embodiment of the radial flow reactor according to the present disclosure;

FIG. 7 is a longitudinal cross-sectional view illustrating another modified example of the beds included in the second embodiment of the radial flow reactor according to the present disclosure;

FIG. 8 illustrates a modeling result from which the difference of the area between the inlet and the outlet of the radial flow reactor according to the present disclosure may be reviewed;

FIG. 9 is a schematic view illustrating an example of a volume adjusting unit included in the radial flow reactor according to the present disclosure;

FIG. 10 is a schematic view illustrating another example of the volume adjusting unit included in the radial flow reactor according to the present disclosure.

DETAILED DESCRIPTION

Hereinafter, various embodiments of the present disclosure will be described with reference to the accompanying drawings. However, the accompanying drawings are presented only to aid the description of various features of the present disclosure, but those skilled in the art to which the present disclosure pertains will appreciate that the scope of the present disclosure is not limited to the scope of the accompanying drawings.

In addition, in describing various embodiments of the present disclosure, the same names and reference numerals will be used for components having the same functions, but it should be understood in advance that the names and reference numerals are not completely the same as those of the related art.

In addition, terms used in various embodiments of the present disclosure are used only to describe specific embodiments and are not intended to limit the present disclosure. A singular form may include a plural form unless the context clearly dictates otherwise. It will be understood that terms "comprise", "have", etc., when used in various embodiments of the present disclosure, are intended to specify the presence of stated features, integers, steps, operations, components, parts, or any entities including any thereof, but do not preclude the possibility of the presence or addition of one or more other features, integers, steps, operations, components, parts, or combinations thereof.

First, a first embodiment of a radial flow reactor 100 according to the present disclosure will be described in detail with reference to FIGS. 4 and 9 to 10.

Here, FIG. 4 is a longitudinal cross-sectional view illustrating a bed included in the first embodiment of the radial flow reactor according to the present disclosure. FIG. 9 is a schematic view illustrating an example of a volume adjusting unit included in the radial flow reactor according to the present disclosure. FIG. 10 is a schematic view illustrating another example of the volume adjusting unit included in the radial flow reactor according to the present disclosure.

The first embodiment of the radial flow reactor 100 according to the present disclosure including beds having a structure as illustrated in FIG. 4 includes a first bed 110 into which a raw material is introduced and a second bed 120 in which a continuous reaction subsequent to a reaction in the first bed 110 occurs. The first embodiment of the radial flow reactor 100 according to the present disclosure having this configuration may be provided with a pair of beds including the first bed 110 and the second bed 120, as will be described later.

Here, each of the first bed 110 and the second bed 120 may include a first flow path 112 or 122 provided along the inner surface of its body in the height direction, a second flow path 114 or 124 provided along the central axis in the height direction, and a reaction region 130 provided between the first flow path 112 or 122 and the second flow path 114 or 124.

In each of the first bed 110 and the second bed 120 configured as above, as a raw material passes through the reaction region 130 while moving from the first flow path 112 or 122 to the second flow path 114 or 124 or from the second flow path 114 or 124 to the first flow path 112 or 122, a substance being produced or a product may be produced.

Here, the substance being produced or the product may be oxygen, nitrogen, or hydrogen having a high level of purity, and each of the reaction regions 130 may include a variety of substances as an active material, in addition to a catalyst, an absorbent, or the like.

That is, each of the reaction regions 130 may be configured to generate oxygen having a high level of purity using air as a raw material so as to be used to configure a pressure swing adsorption gas generating apparatus or a vacuum pressure swing adsorption gas generating apparatus, so that the radial flow reactor 100 according to the present disclosure may be used as a portion of an oxygen generating apparatus.

In the first embodiment of the radial flow reactor 100 according to the present disclosure including the first bed 110 and the second bed 120 as described above, the first bed 110 and the second bed 120 may be connected in series, thereby forming an overall inner area gradient having the shape of .

Here, in the inner area gradient formed in the shape of , a bottom edge refers to a side on which an inlet through which the raw material is supplied is positioned, while a top edge refers to a side on which an outlet through which the substance being produced or the product is discharged is positioned. The bottom edge and the top edge may not have symmetric shapes, and left and right sides may have curved shapes with various inclinations.

The first embodiment of the radial flow reactor 100 according to the present disclosure including a pair of beds including the first bed 110 and the second bed 120 and having the overall inner area gradient in the shape of , as described above, is configured such that the substance being produced or the product is movable between the pair of beds before the product is moved to a separate reservoir. Thus, it does not have limited processing efficiency caused by the limited area of the outlet of any one of the pair of beds, as described above in the background art section.

This is because flow directions, heights, widths, etc. for the first bed 110 and the second bed 120 of each of the pair of beds may be in advance modeled and set, so that the area ratio of the outlet to the inlet of the entirety of the reactor including the first bed 110 and the second bed 120 may be adjusted.

Here, if the area of the outlet is wide enough to be capable of corresponding to the area of the inlet, the area ratio of the outlet to the inlet of the entirety of the reactor may be included in the scope of the present disclosure. Advantageously, in the entirety of the reactor, the area of the outlet may be at least 0.7 to 1.7 times the area of the inlet.

The above numerical limitation of 0.7 to 1.7 times is a limitation intended to explain as an example that the area of the outlet is wide enough to correspond to the area of the inlet. Any numerical value (e.g., a numerical value of about 1.8 times) that may be changed from the above numerical limitation by those skilled in the art will be regarded as falling within the scope of the present disclosure.

In addition, in a case in which the area of the outlet is 0.7 to 1.7 times the area of the inlet in the entirety of the reactor, it may be assumed that the active material of the reaction regions 130 is deformed into the shape of a cylinder or a prism having a height of 3.5 ft (about 1.07 m). In this case, it is possible to adjust the area of either the inlet or the outlet to be at least 0.9 time the area of the base of the cylinder or the prism. This may be more advantageous in terms of the processing efficiency.

Since the area of the outlet may be adjusted to be 0.7 to 1.7 times the area of the inlet as described above, it is possible to overcome the limitation in which the processing efficiency is lowered due to the limited outlet area when the substance being produced or the product is introduced through the outlet of one of the pair of beds including the first bed 110 and the second bed 120 from the other of the pair of beds including the first bed 110 and the second bed 120.

The limitation of the conventional radial flow reactor 10 can be overcome in this manner, since the area ratio of the outlet with respect to the inlet of the entire reactor including the first bed 110 and the second bed 120 can be adjusted as described above. The area ratio of the outlet with respect to the inlet can be adjusted, since each of the pair of beds is comprised of a plurality of beds, such as the first bed 110 and the second bed 120, and the flow directions, the heights, the widths, etc. for the first bed 110 and the second bed 120 can be set.

In particular, setting the flow directions in the first bed 110 and the second bed 120 may be an important factor in adjusting the area ratio of the outlet with respect to the inlet of the entire reactor, which will be described hereinafter in detail with reference to FIG. 4.

As illustrated in FIG. 4, there is little difference between a diameter D4 by which the area of the inlet portion of the first bed 110 corresponding to the inlet of the first embodiment of the radial flow reactor 100 according to the present disclosure is determined and a diameter D5 by which the area of the outlet portion of the second bed 120 corresponding to the outlet of the first embodiment of the radial flow reactor 100 according to the present disclosure is determined.

In addition, the raw material is supplied to the first flow path 112 of the first bed 110 and passes through the reaction region 130 of the first bed 110, and the substance being produced or the product is discharged through the second flow path 114 of the first bed 110. Then, the substance being produced or the product may be introduced into the second flow path 124 of the second bed 120. Thus, when h2 and h3 are adjusted, the ratio of the area of the outlet with respect to the inlet in the first embodiment of the radial flow reactor 100 according to the present disclosure may be adjusted.

In this configuration, after the raw material is introduced and before the substance being produced or the product is produced and discharged, the overall area gradient inside one bed of the first embodiment of the radial flow reactor 100 according to the present disclosure has the shape of .

That is, in FIG. 4, the area gradient inside the first bed 110 in which a flow F2 is formed from a flow F1 passing through the reaction region 130 of the first bed 110 has a trapezoidal shape, whereas the area gradient inside the second bed 120 in which a flow F4 is formed from a flow F3 passing through the reaction region 130 of the second bed 120, in which a reaction continuously occurs subsequent to the first bed 110, has an inverted trapezoidal shape. Thus, the overall area gradient inside one bed of the first embodiment of the radial flow reactor 100 according to the present disclosure has the shape of , by which the limitation of the conventional radial flow reactor 10, as described in the background art section, can be overcome.

Meanwhile, the first bed 110 and the second bed 120 of each of the pair of beds included in the first embodiment of the radial flow reactor 100 according to the present disclosure may further include a volume adjusting unit 140 on top of the respective reaction region 130.

Here, the volume adjusting unit 140 may have various structures and shapes that can cope with changes in the volume of the reaction region 130 caused by fixation of an active material etc. through repetitive generation of the substance being produced or the product. Although there is any reason for changes in the volume of the reaction region 130, which has not been discovered or known yet, the scope of protection is not limited thereby.

A more detailed description will be provided as follows with reference to FIGS. 9 to 10.

First, as illustrated in FIG. 9, the volume adjusting unit 140 may include a bag 142 in which a fluid capable of swelling in response to a change in the volume of the reaction region 130 is contained.

Here, the bag 142 may be made of a variety of flexible materials allowing the fluid to swell in response to a change in the volume of the reaction region 130. The bag 142 may have a curved shape as illustrated in FIG. 9 but is not necessarily limited thereto.

In addition, when the bag 142 has the curved shape, the bag 142 may not be properly disposed on top of the reaction region 130. Thus, a separate boundary layer 144 may be provided between the reaction region 130 and the bag 142. The material, shape, or the like of the boundary layer 144 may vary.

Meanwhile, as illustrated in FIG. 10, the volume adjusting unit 140 may include a flexible gasket 146 configured to be moved upward or downward in response to a change in the volume of the reaction region 130 and weights 148 configured to move the gasket 146 downward and maintain the gasket 146 in equilibrium.

Here, the equilibrium may include a state in which there is no space between the gasket 146 and the reaction region 130. The equilibrium comprehensively refers to a state in which there is no factor interfering with a reaction even in the case that the reaction continuously occurs.

In addition, the gasket 146 may be made of a variety of flexible materials capable of moving upward and downward in response to a change in the volume of the reaction region 130. The shape of the gasket 146 is not limited as long as the gasket 146 can accommodate the weights 148 as illustrated in FIG. 10.

In addition, the shape of the weights 148 is not limited to small spheres as illustrated in FIG. 10, but the weights 148 may have a variety of shapes, if the weights 148 can move the gasket 146 downward and maintain the gasket 146 in equilibrium, e.g., a state in which there is no space between the gasket 146 and the reaction region 130.

Next, a second embodiment of the radial flow reactor 100 according to the present disclosure will be described in detail with reference to FIGS. 5 to 7.

Here, FIG. 5 is a longitudinal cross-sectional view illustrating beds included in the second embodiment of the radial flow reactor according to the present disclosure. FIG. 6 is a longitudinal cross-sectional view illustrating a modified example of the beds included in the second embodiment of the radial flow reactor according to the present disclosure. FIG. 7 is a longitudinal cross-sectional view illustrating another modified example of the beds included in the second embodiment of the radial flow reactor according to the present disclosure.

As illustrated in FIGS. 5 to 7, the second embodiment of the radial flow reactor 100 according to the present disclosure may be configured such that the first bed 110 and the second bed 120 providing the pair of beds included in the radial flow reactor 100 according to the present disclosure are provided as respective bodies connected through a connecting pipe 150, differently from the first embodiment in which the first bed 110 and the second bed 120 are provided in a single body.

However, although the first bed 110 and the second bed 120 are connected through the connecting pipe 150, the entirety of the first bed 110 and the second bed 120 providing the pair of beds included in the second embodiment of the radial flow reactor 100 according to the present disclosure should be configured such that the area gradient has the shape of  .

In an example, one of the pair of beds included in the second embodiment of the radial flow reactor 100 according to the present disclosure may be configured such that, when a raw material is supplied through the first flow path 112 of the first bed 110 and passes through the reaction region 130 of the first bed 110 and a substance being produced or a product is discharged through the second flow path 114 of the first bed 110, the substance being produced or the product may be introduced through the second flow path 124 of the second bed 120, as illustrated in FIG. 5.

In the above-described example illustrated in FIG. 5, as illustrated in FIG. 6, the direction of a flow F2 in the second flow path 114 of the first bed 110 and the direction of a flow F3 in the second flow path 124 of the second bed 120 may be inverted by changing the position of the connecting pipe 150. Even in this change, there is no change in the configuration in which, when the substance being produced or the product is discharged through the second flow path 114 of the first bed 110, the substance being produced or the product may be introduced into the second flow path 124 of the second bed 120, and the area gradient of the entirety of the first bed 110 and the second bed 120 may have the shape of  .

Meanwhile as long as the second embodiment of the radial flow reactor 100 according to the present disclosure is configured such that the first bed 110 and the second bed 120 are connected through the connecting, pipe 150, there may be a configuration, as illustrated in FIG. 7, in which, when the raw material is supplied into the second flow path 114 of the first bed 110 and passes through the reaction region 130 of the first bed 110 and the substance being produced or the product is discharged through the first flow path 112 of the first bed 110, the substance being produced or the product may be introduced into the first flow path 122 of the second bed 120.

In this configuration in which a portion through which the raw material flows and a portion through which the substance being produced or the product flows are in opposite sides, the area gradient of the entirety of the first bed 110 and the second bed 120 has the shape of . Even in this case, when the substance being produced or the product is introduced into the outlet of one of the pair of beds from the other of the pair of beds, the limited processing efficiency caused by the limited area of the outlet of one of the pair of beds can equally be overcome by adjusting the area ratio of the outlet with respect to the inlet. Therefore, it should be understood that the second embodiment of the radial flow reactor 100 according to the present disclosure is within the scope of the present disclosure.

Meanwhile, also in the second embodiment of the radial flow reactor 100 according to the present disclosure, the volume adjusting unit 140 may also be included. This feature is substantially the same as in the first embodiment and thus a description thereof will be omitted.

In the first embodiment and the second embodiment of the radial flow reactor 100 according to the present disclosure as described above, a substance being produced or a product is movably produced between the pair of beds before the product is moved to a separate reservoir. To overcome the limited processing efficiency caused by the limited area of the outlet of one of the pair of beds when the substance being produced or the product is introduced into the outlet of one of the pair of beds from the other of the pair of beds, the area ratio of the outlet with respect to the inlet in the entirety may be adjusted irrespective of whether the first bed 110 and the second bed 120 of the pair of beds are directly connected to each other as a single body or are connected to each other through the connecting pipe 150.

As described above, if the first bed 110 and the second bed 120 are configured such that the area ratio of the outlet with respect to the inlet is adjustable so that the area gradient has the shape of  (or  in some cases), although the beds are not directly connected as a single body as in the above-described first embodiment or are not connected using the connecting pipe 150 as in the above-described second embodiment, all of such configurations are within the scope of the present disclosure. Even in the case that the first bed 110 and the second bed 120 are variously formed in different shapes, sizes, or materials, all of such configurations are within the scope of the present disclosure.

The radial flow reactor 100 having this scope of right, according to the present disclosure, has a modeling result illustrated in FIG. 8 as an example, differently from the modeling result illustrated in FIG. 3 as an example in the background art section.

That is, referring to the modeling result of the conventional radial flow reactor 10 illustrated in FIG. 3, compared to the areas of the inlet and the outlet of the axial flow reactor including an active material formed in a height of 3.5 ft (about 1.07 m), the conventional radial flow reactor 10 including an active material having the same quantity and of the same type has an inlet area ratio of 145% and an outlet area ratio of 93%. The area of the outlet is merely 63% (=93/145×100%) of the area of the inlet.

That is, in the conventional radial flow reactor 10, the area of the outlet depends on the area of the inlet and thus is quite small. Thus, when a substance being produced or a product is introduced into the outlet of one of the pair of beds from the other of the pair of beds, processing efficiency should be limited due to the limited area of the outlet of each of the pair of beds.

However, referring to the modeling result of the radial flow reactor 100 according to the present disclosure illustrated in FIG. 8, compared to the areas of the inlet and the outlet of the axial flow reactor including an active material formed in a height of 3.5 ft (about 1.07 m), the radial flow reactor 100 according to the present disclosure including an active material having the same quantity and of the same type has an inlet area ratio of 126% and also has an outlet area ratio of 126%, such that the area of the outlet may be adjusted to be 100% (=126/126×100%) of the area of the inlet. Accordingly, it is possible to overcome the limited processing efficiency caused by the limited area of the outlet.

Although the foregoing embodiments of the present disclosure have been described hereinabove, it will be apparent to those skilled in the art to which the present disclosure pertains that the present disclosure can be embodied in specific forms other than the foregoing embodiments without departing from the gist or scope of the present disclosure.

Accordingly, the foregoing embodiments shall be interpreted as being illustrative while not being limitative, and thus, the present disclosure is not limited to the above description and may be changed within the scope of the appended claims and their equivalents.

What is claimed is:

1. A radial flow reactor comprising:
a first bed and a second bed, each comprising a cylindrical body, an annular reaction region provided along a central axis within the body, a first flow path provided between an inner surface of the body and the reaction region, and a second flow path provided between the central axis of the body and the reaction region,
wherein an inlet of the reactor is connected to the first flow path of the first bed, the first flow path of the first bed is not connected to the first flow path of the second bed, the second flow path of the first bed and the second flow path of the second bed are connected to each other, and an outlet of the reactor is connected to the first flow path of the second bed,
wherein, when a raw material is introduced into the inlet of the reactor, the raw material sequentially passes through the first flow path of the first bed, the reaction region of the first bed, the second flow path of the first bed, the second flow path of the second bed, the reaction region of the second bed, and the first flow path of the second bed, thereby forming a product, and the product is discharged through the outlet of the reactor, and
wherein a ratio of an area of the outlet with respect to an area of the n inlet in the entire reactor including the first bed and the second bed is adjusted by configuring the first flow path of the first bed and the first flow path of the second bed to correspond to each other equally.

2. The radial flow reactor of claim 1, wherein the ratio of the area of the outlet with respect to the area of the inlet in the entire reactor including the first bed and the second bed ranges from 0.7 to 1.7.

3. The radial flow reactor of claim 1, wherein the raw material is air, and the product is oxygen, and the entire reactor including the first bed and the second bed is used as a portion of a pressure swing adsorption oxygen generator or a vacuum pressure swing adsorption oxygen generator.

4. The radial flow reactor of claim 1, wherein an area gradient of an internal flow in the entire reactor including the first bed and the second bed has a shape of  when the inlet is on a top edge and the outlet is on a bottom edge.

5. A radial flow reactor comprising:
   a pair of beds configured to produce a product by processing a raw material supplied thereto, wherein:
   a substance being produced or the product is movable between the pair of beds before the product is moved to a separate reservoir,
   a ratio of an area of an outlet with respect to an area of an inlet in each of the pair of beds is adjusted in order to overcome limited processing efficiency caused by the limited area of the outlet in each of the pair of beds, when the substance being produced or the product is introduced into the outlet of one bed of the pair of beds from the other bed of the pair of beds;
   wherein each bed of the pair of beds, comprises a first bed and a second bed,
   wherein each of the first bed and the second bed comprises a cylindrical body, an annular reaction region provided along a central axis within the body, a first flow path provided between an inner surface of the body and the reaction region, and a second flow path provided between the central axis of the body and the reaction region, and
   wherein, in each bed of the pair of beds,
      the inlet of the bed is connected to the first flow path of the first bed, the first flow path of the first bed is not connected to the first flow path of the second bed, the second flow path of the first bed and the second flow path of the second bed are connected each other, and the outlet of the bed is connected to the first flow path of the second bed, and
      when a raw material is introduced into the inlet of the bed, the raw material sequentially passes through the first flow path of the first bed, the reaction region of the first bed, the second flow path of the first bed, the second flow path of the second bed, the reaction region of the second bed, and the first flow path of the second bed, thereby forming the substance being produced or the product, and the substance being produced or the product is discharged through the outlet of the bed.

6. The radial flow reactor of claim 5, wherein, when the raw material is supplied first to one bed of the pair of beds, the product is discharged through the other bed of the pair of beds, and continuously, when the raw material is supplied to the other bed, from which the product has been discharged, the product is discharged through the one bed to which the raw material has been supplied.

7. The radial flow reactor of claim 6, wherein, when the inlet of the bed of the pair of beds, to which the raw material is supplied, is on a bottom edge and the outlet of the bed is on a top edge, an inner area gradient of the bed of the pair of beds, to which the raw material is supplied, has a shape of  after the raw material is introduced and before the substance being produced or the product moves to the bed of the pair of beds, from which the product is discharged.

8. The radial flow reactor of claim 7, wherein the first bed and the second bed are connected in series, thereby forming an inner area gradient having a shape of  when the inlet of the bed of the pair of beds, to which the raw material is supplied, is on the bottom edge and the outlet of the bed is on the top edge.

9. The radial flow reactor of claim 5, wherein, in each of the pair of beds, the ratio of the area of the outlet with respect to the area of the inlet in the entire bed including the first bed and the second bed ranges from 0.7 to 1.7.

10. The radial flow reactor of claim 5, wherein the first bed and the second bed have different shapes and sizes and are made of different materials.

11. The radial flow reactor of claim 5, wherein the raw material is air, and the product is oxygen, and
   the pair of beds is used as a portion of a pressure swing adsorption oxygen generator or a vacuum pressure swing adsorption oxygen generator.

* * * * *